United States Patent
Okamoto (10) Patent No.: US 9,252,607 B2
(45) Date of Patent: Feb. 2, 2016

(54) COMMUNICATION TERMINAL, CHARGE CONTROL PROGRAM AND CHARGE CONTROL METHOD

(75) Inventor: Atsumi Okamoto, Osaka (JP)

(73) Assignee: KYOCERA Corporation, Kyoto (JP)

( * ) Notice: Subject to any disclaimer, the term of this patent is extended or adjusted under 35 U.S.C. 154(b) by 736 days.

(21) Appl. No.: 13/555,977

(22) Filed: Jul. 23, 2012

(65) Prior Publication Data

US 2013/0021003 A1    Jan. 24, 2013

(30) Foreign Application Priority Data

Jul. 21, 2011  (JP) ................... 2011-159720

(51) Int. Cl.
  *H02J 7/04* (2006.01)
  *H02J 7/16* (2006.01)
  *H02J 7/00* (2006.01)

(52) U.S. Cl.
  CPC .......... *H02J 7/0029* (2013.01); *H02J 7/0047* (2013.01); *H02J 7/0081* (2013.01); *H02J 7/0091* (2013.01); *H02J 7/0093* (2013.01); *H02J 2007/004* (2013.01); *H02J 2007/0037* (2013.01); *H02J 2007/0039* (2013.01); *H02J 2007/0049* (2013.01)

(58) Field of Classification Search
  USPC ................................ 320/144, 145
  See application file for complete search history.

(56) References Cited

U.S. PATENT DOCUMENTS

| | | | | |
|---|---|---|---|---|
| 5,814,973 | A * | 9/1998 | Liu | 320/137 |
| 2005/0017692 | A1 | 1/2005 | Izumi et al. | |
| 2007/0287509 | A1* | 12/2007 | Izumi et al. | 455/573 |
| 2010/0203928 | A1* | 8/2010 | Lopata | 455/573 |

FOREIGN PATENT DOCUMENTS

| | | |
|---|---|---|
| JP | 2004-104910 A | 4/2004 |
| JP | 2005-045669 A | 2/2005 |
| JP | 2005-065476 A | 3/2005 |
| JP | 2005-333794 A | 12/2005 |
| JP | 2007-336654 A | 12/2007 |
| JP | 2009-017779 A | 1/2009 |

OTHER PUBLICATIONS

An Office Action; "Notice of Reasons for Rejection," issued by the Japanese Patent Office on Oct. 7, 2014, which corresponds to Japanese Patent Application No. 2011-159720 and is related to U.S. Appl. No. 13/555,977; with English language concise explanation.

* cited by examiner

*Primary Examiner* — Richard Isla Rodas
*Assistant Examiner* — David V Henze-Gongola
(74) *Attorney, Agent, or Firm* — Studebaker & Brackett PC (57) ABSTRACT

A communication terminal having a secondary battery and configured to control charge of the secondary battery, a charge control program, and a charge control method of the communication terminal are provided. The communication terminal includes a first detection unit configured to detect a temperature, a second detection unit configured to detect a transmission power of an electric wave, a charge unit configured to perform intermittent charge to the secondary battery, and a change unit configured to change a duty ratio of the intermittent charge by the charge unit based on the temperature detected by the first detection unit and the transmission power detected by the second detection unit.

3 Claims, 7 Drawing Sheets

| surrounding temperature | high temperature | | | middle temperature | | | low temperature | | |
|---|---|---|---|---|---|---|---|---|---|
| transmission power | strong | middle | weak | strong | middle | weak | strong | middle | weak |
| charge state | first intermittent charge | second intermittent charge | third intermittent charge | second intermittent charge | third intermittent charge | continuous charge | third intermittent charge | continuous charge | continuous charge |

(A) first intermittent charge

(B) second intermittent charge (C) third intermittent charge (D) continuous charge

FIG. 4

| surrounding temperature | |
|---|---|
| high temperature | $T_A > t_1$ |
| middle temperature | $t_1 \geq T_A > t_2$ |
| low temperature | $t_2 \geq T_A$ |

FIG. 5

| transmission power | |
|---|---|
| strong | $P > p_1$ |
| middle | $p_1 \geq P > p_2$ |
| weak | $p_2 \geq P$ |

FIG. 6

| surrounding temperature | high temperature | | | middle temperature | | | low temperature | | |
|---|---|---|---|---|---|---|---|---|---|
| transmission power | strong | middle | weak | strong | middle | weak | strong | middle | weak |
| charge state | first inter-mittent charge | second inter-mittent charge | third inter-mittent charge | second inter-mittent charge | third inter-mittent charge | continuous charge | third inter-mittent charge | continuous charge | continuous charge |

COMMUNICATION TERMINAL, CHARGE CONTROL PROGRAM AND CHARGE CONTROL METHOD

CROSS-REFERENCE TO RELATED APPLICATION

This application claims priority from Japanese Patent Application No. 2011-159720, filed on Jul. 21, 2011, the entire subject matter of which is incorporated herein by reference.

BACKGROUND OF THE INVENTION

1. Field of the Invention

The present invention relates to a communication terminal, a charge control program and a charge control method, and more particularly, to a communication terminal which is operated by a secondary battery, a charge control program and a charge control method of the communication terminal.

2. Description of the Related Art

JP 2005-333794 A describes an example of a communication terminal which is operated by a secondary battery. In this communication terminal, when a wireless unit becomes at a communication state during charge of a battery pack, a mobile communication terminal makes a current value of a charging current smaller, compared to a case where the wireless unit is not at the communication state. At this time, when a temperature is below a threshold, the mobile communication terminal does not change the current value of the charging current even when the communication state is made during the charge.

SUMMARY OF THE INVENTION

However, according to the above-described communication terminal, it is not possible to change a charging state according to a change in an output power of a wireless unit.

Accordingly, an aspect of the present invention provides a novel communication terminal, a charge control program and a charge control method.

Another aspect of the present invention provides a communication terminal capable of appropriately charging a secondary battery, a charge control program and a charge control method of the communication terminal.

According to an illustrative embodiment of the present invention, there is provided a communication terminal having a secondary battery and configured to control charge of the secondary battery. The communication terminal includes: a first detection unit configured to detect a temperature; a second detection unit configured to detect a transmission power of an electric wave; a charge unit configured to perform intermittent charge to the secondary battery; and a change unit configured to change a duty ratio of the intermittent charge by the charge unit based on the temperature detected by the first detection unit and the transmission power detected by the second detection unit.

According to the above configuration, when performing the intermittent charge to the secondary battery, the duty ratio is changed based on the receiving state of the electric wave and the housing temperature. Hence, it is possible to appropriately charge the secondary battery.

The above communication terminal may further include a temperature determination unit configured to determine one of a plurality of temperature ranges based on the temperature detected by the first detection unit, and the change unit may be configured to set different duty ratios according to the transmission power, for each of the temperature ranges.

According to the above configuration, it is possible to set the duty ratio such that an amount of heat generation in the charge unit is decreased when the temperature is higher and to set the duty ratio such that the time required to charge the secondary battery becomes shorter when the temperature is lower.

The above communication terminal may further include a transmission power determination unit configured to determine one of a plurality of transmission power ranges based on the transmission power detected by the second detection unit, and the change unit may be configured to set different duty ratios for the respective transmission power ranges, for each of the temperature ranges.

According to the above configuration, since the duty ratio is set based on a combination of the temperature ranges and the transmission power ranges, it is possible to easily grasp the state where the secondary battery is being charge.

According to another illustrative embodiment of the present invention, there is provided a computer-readable storage medium having a charge control program stored thereon and readable by a processor of a communication terminal which includes a secondary battery, a detection unit configured to detect a temperature and a transmission power of an electric wave, and a charge unit configured to perform intermittent charge to the secondary battery, and which is configured to control charge of the secondary battery, the charge control program, when executed by the processor, causing the processor to perform operations including changing a duty ratio of the intermittent charge by the charge unit based on the temperature and the transmission power detected by the detection unit.

According to the above configuration, when performing intermittent charge to the secondary battery, the duty ratio is set based on the receiving state of the electric wave and the housing temperature. Hence, it is possible to appropriately charge the secondary battery.

According to a further illustrative embodiment of the present invention, there is provided a charge control method of a communication terminal which includes a secondary battery, a detection unit configured to detect a temperature and a transmission power of an electric wave, and a charge unit configured to perform intermittent charge to the secondary battery, and which is configured to control charge of the secondary battery, the method including changing a duty ratio of the intermittent charge by the charge unit based on the temperature and the transmission power detected by the detection unit.

According to the above configuration, when performing intermittent charge to the secondary battery, the duty ratio is set based on the receiving state of the electric wave and the housing temperature. Hence, it is possible to appropriately charge the secondary battery.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION OF THE INVENTION

Figure 1:
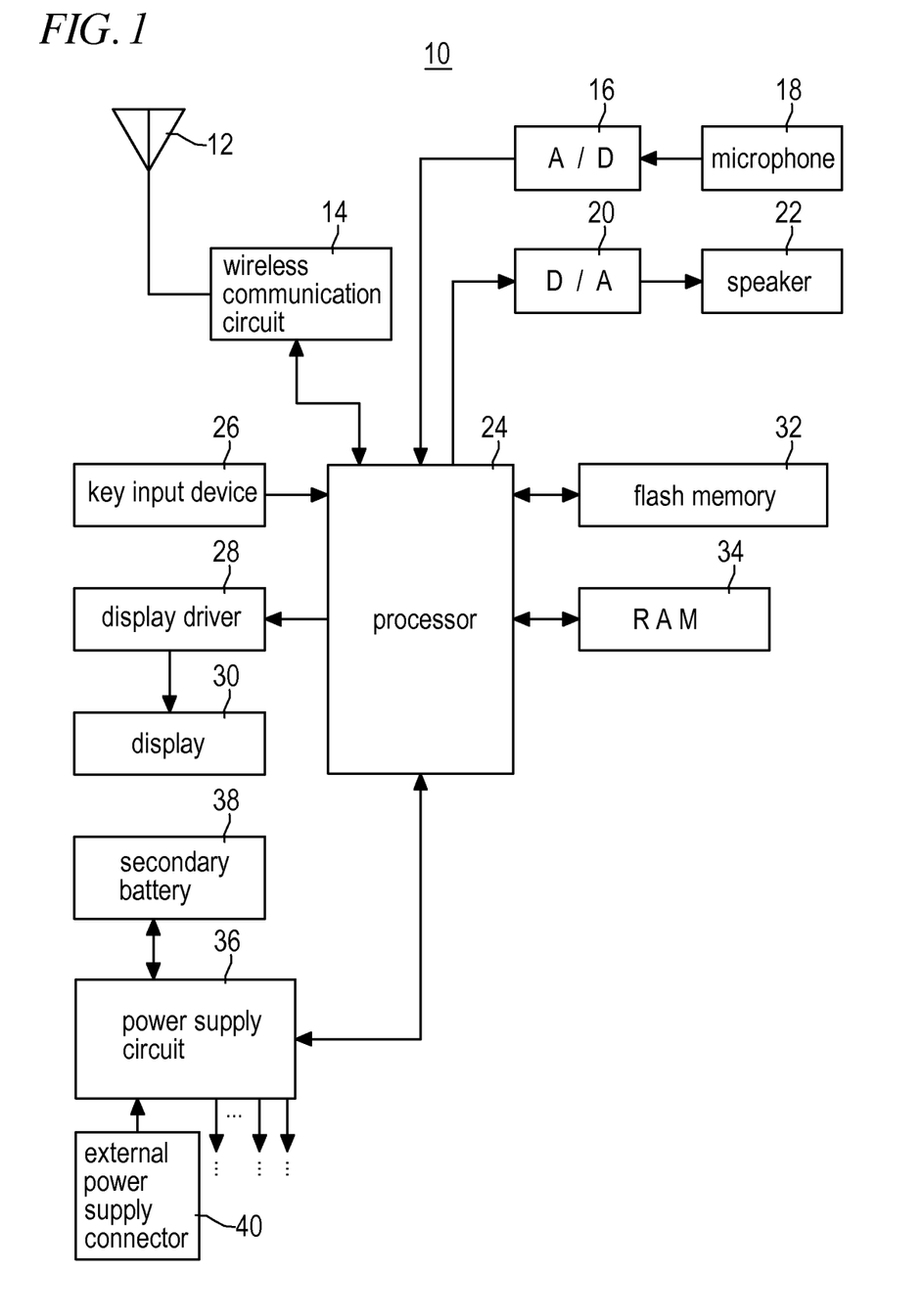
FIG. 1 is a block diagram showing an electrical configuration of a portable phone according to an illustrative embodiment.

Referring to FIG. 1, a portable phone 10 (an example of a communication terminal) of this illustrative embodiment includes a processor 24 which is also referred to as a computer or a CPU. The processor 24 is connected with a wireless communication circuit 14, an A/D converter 16, a D/A converter 20, a key input device 26, a display driver 28, a flash memory 32, a RAM 34 and a power supply circuit 36. The wireless communication circuit 14 is connected with an antenna 12, the A/D converter 16 is connected with a microphone 18 and the D/A converter 20 is connected with a speaker 22. The display driver 28 is connected with a display 30. The power supply circuit 36 is connected with a secondary battery 38 and an external power supply connector 40.

The processor 24 controls the overall portable phone 10. The RAM 34 can be used as a working area (including a drawing area) or buffer area for the processor 24. Data of contents such as characters, picture images, voice, sound and images is recorded in the flash memory 32.

The A/D converter 16 converts an analog voice signal of voice or sound, which is input through the microphone 18, into a digital voice signal. The D/A converter 20 converts (decodes) the digital voice signal into an analog voice signal and provides the same to the speaker 22 via an amplifier (not shown). Therefore, the voice or sound corresponding to the analog voice signal is output from the speaker 22. In the meantime, the processor 24 can adjust a volume of the voice to be output from the speaker 22 by controlling an amplification factor of the amplifier.

The key input device 26 includes a cursor key, a call key, a call ending key and the like. Information (key data) of a key operated by a user is input to the processor 24. Also, when each key of the key input device 26 is operated, click sound is generated. Hence, the user can obtain a feeling of operation about the key operation by hearing the click sound.

The display driver 28 controls display of the display 30 connected to the display driver 28 under control of the processor 24. Also, the display driver 28 includes a video memory (not shown) which temporarily stores therein the image data to be displayed.

The wireless communication circuit 14 is a circuit for performing wireless communication by a CDMA method. For example, when the user instructs an outgoing call by using the key input device 26, the wireless communication circuit 14 executes outgoing call processing and outputs an outgoing call signal through the antenna 12 under control of the processor 24. The outgoing call signal is transmitted to another party's phone via a base station and a communication network (not shown). When incoming call processing is performed in the other party's phone, a communication-capable state is established and the processor 24 executes call processing.

The normal call processing is specifically described. The modulated voice signal transmitted from the other party's phone is received by the antenna 15. The wireless communication circuit 14 performs demodulation processing and decoding processing for the received modulated voice signal. A reception voice signal obtained by the processing is converted into an analog voice signal by the D/A converter 20, which is then output from the speaker 22. In the meantime, the transmission voice signal received through the microphone 18 is converted into a digital voice signal by the A/D converter 16, which is then provided to the processor 24. The wireless communication circuit 14 performs encoding processing and modulation processing for the transmission voice signal converted into the digital voice signal under control of the processor 24, which is then output through the antenna 12. Accordingly, the modulated voice signal is transmitted to the other party's phone through the base station and the communication network.

Also, when an outgoing call signal from the other party's phone is received by the antenna 12, the wireless communication circuit 14 notifies the processor 24 of the incoming call. Thereby, the processor 24 controls the display driver 28 to display transmission source information (phone number and the like) described in the notification on the display 30. Also, at the same time, the processor 24 outputs a ringtone (which may be also referred to as ringing melody or ringing voice) from a speaker (not shown).

When the user performs a response operation by using the call key, the wireless communication circuit 14 executes incoming call processing under control of the processor 24. Then, the communication-capable state is established and the processor 24 executes the above-described normal call processing.

Also, when a call ending operation is performed by the call ending key after the communication-capable state, the processor 24 controls the wireless communication circuit 14 to transmit a call ending signal to the other party of the call. After transmitting the call ending signal, the processor 24 ends the call processing. Also, when the call ending signal is first received from the other party of the call, the processor 24 ends the call processing. Further, when a call ending signal is received from the mobile communication network, regardless of the other party of the call, the processor 24 ends the call processing.

The wireless communication circuit 14 can change the transmission power P based on a control signal from a wireless base station or an electric field strength of the received electric wave. For example, the wireless communication circuit 14 increases the transmission power P in a weak electric field and decreases the transmission power P in a strong electric field. When the transmission power P is increased, the heat generation is increased in the wireless communication circuit 14, and when the transmission power P is decreased, the heat generation is decreased. That is, the wireless communication circuit 14 more generates the heat in the weak electric field and less generates the heat in the strong electric field.

The power supply circuit 36 is an IC for power supply management which functions as an example of a charge unit and is connected with the secondary battery 38 which is a lithium ion battery and with the external power supply connector 40. Also, the power supply circuit 36 supplies power to the overall system from a voltage of the secondary battery 38. Here, a state where the power supply circuit 36 supplies the power to the overall system is referred to as a power on state. On the other hand, a state where the power supply circuit 36 does not supply the power to the overall system is referred to as a power off state. At this time, since it is necessary to receive the key data from the key input device 26 even at the power off state, the power is always supplied to the processor 24. When a power on operation is performed at the power off state by the key input device 26, the power supply circuit 36 is activated. When a power off operation is performed at the power on state by the key input device 26, the power supply circuit is deactivated. Also, when an external power supply is connected to the external power supply connector 40 and thus the secondary battery 38 is supplied (charged) with the power, the power supply circuit 36 is activated even at the power off state. When a full charge state of the secondary battery 38 is detected, the power supply circuit 36 is deactivated. Also, since the power supply circuit 36 changes a voltage of the external power supply during the charging, it generates the heat due to the power loss.

In the meantime, the "charge (charging)" described herein means that the power is supplied from the external power supply through the external power supply connector 40 and the electric energy is thus accumulated in the secondary battery 38. The processor 24 detects the full charge state based on a current value.

Also, the external power supply connector 40 is connected with an external power supply converted from an alternating current power supply such as AC adapter or external power supply converted from a direct current power supply such as DC adapter. Also, the external power supply connector 40 is connected with an external power supply through a USB cable and the like.

Figure 2:
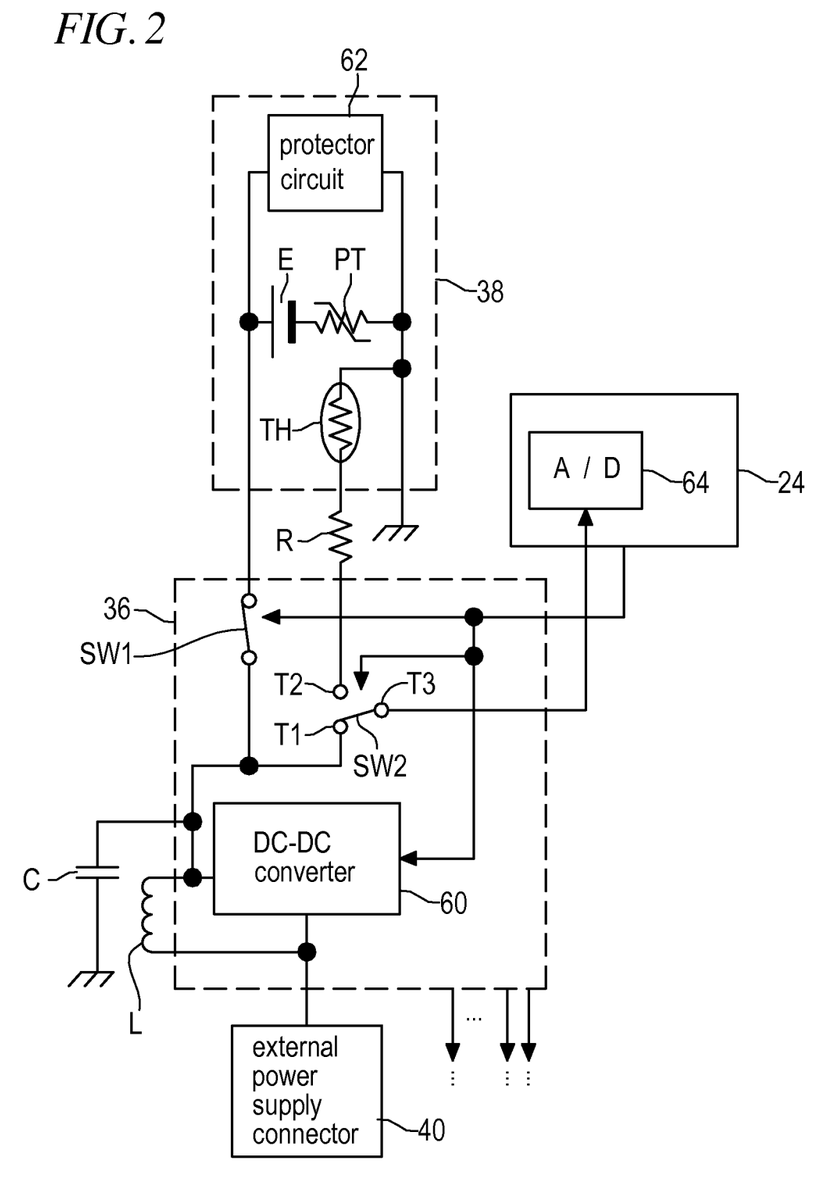
FIG. 2 is a circuit diagram specifically showing a power supply circuit and a secondary battery shown in FIG. 1.

FIG. 2 is a circuit diagram specifically showing the processor 24, the power supply circuit 36 and the secondary battery 38. The power supply circuit 36 includes a DC-DC converter 60, switches SW1, SW2 and the like. The secondary battery 38 includes a protector circuit 62, a direct current power supply E, a poly switch PT, a thermistor TH and the like.

First, the external power supply connector 40 is connected to an input terminal (not shown) of the DC-DC converter 60. One end of a coil L is connected to a connection point between the external power supply connector 40 and the DC-DC converter 60, and the other end of the coil L is connected to an output terminal (not shown) of the DC-DC converter 60.

The output terminal of the DC-DC converter 60 is connected with one end of a capacitor C and the other end of the capacitor C is grounded. Also, the output terminal of the DC-DC converter 60 is connected with one end of the switch SW1 and a terminal T1 of the switch SW2. The other end of the switch SW1 is connected to a positive (+) electrode of a direct current power supply E of the secondary battery 38 and the protector circuit 62. The direct current power supply E is shown with an equivalent circuit with respect to a cell voltage. Also, a terminal T2 of the switch SW2 is connected to one end of the thermistor TH embedded in the secondary battery 38 via a resistance R. A negative (−) electrode of the direct current power supply E is grounded via the poly switch PT. Also, the other end of the thermistor TH and the protector circuit 62 are also grounded. A terminal T3 of the switch SW2 is connected to an A/D converter 64 embedded in the processor 24.

Also, as shown in FIG. 2, the switching of the switches SW1, SW2 are controlled by the processor 24. Also, the DC-DC converter 60 is controlled by the processor 24, transforms a voltage of power from the external power supply and supplies the same to the secondary battery 38.

For example, when the external power supply is connected to the external power supply connector 40, the power that is supplied from the external power supply is input to the DC-DC converter 60. The DC-DC converter 60 transforms a voltage of the input power according to a command signal from the processor 24 and supplies the same to the secondary battery 38. Also, when the transformation is made by the DC-DC converter 60, the electric energy is accumulated in the coil L and the noise generated due to the transformation is removed by the capacitor C.

The processor 24 measures a battery voltage (cell voltage) of the secondary battery 38 and a battery temperature of the secondary battery 38. Although not shown, a resistance for measuring a voltage is embedded in the A/D converter 64. Therefore, the processor 24 measures a voltage of the direct current power supply E, i.e., a battery voltage by switching the switch SW2 to the terminal T1. Also, the processor 24 measures a battery temperature $T_B$ by switching the switch SW2 to the terminal T2. At this time, the processor 24 measures the battery temperature by a change of a resistance value of the thermistor TH relative to a resistance value of the resistance R. Then, the processor 24 controls a charge state of the secondary battery 38 based on the battery voltage, the battery temperature $T_B$ of the secondary battery 38 and the like.

During the charge (the present invention is not limited thereto), the protector circuit 62 of the secondary battery 38 protects the direct current power supply E from overcharge, over-discharge, discharge over-current, short and the like, and the poly switch PT protects the direct current power supply E from an outside short.

When a full charge state is detected, the switch SW1 becomes off. Thus, the power from the external power supply is supplied from the power supply circuit 36 to the respective circuit components of the portable phone 10. When the connection of the external power supply is released, the switch SW1 becomes on, so that the power of the secondary battery 38 is used.

Figure 3:
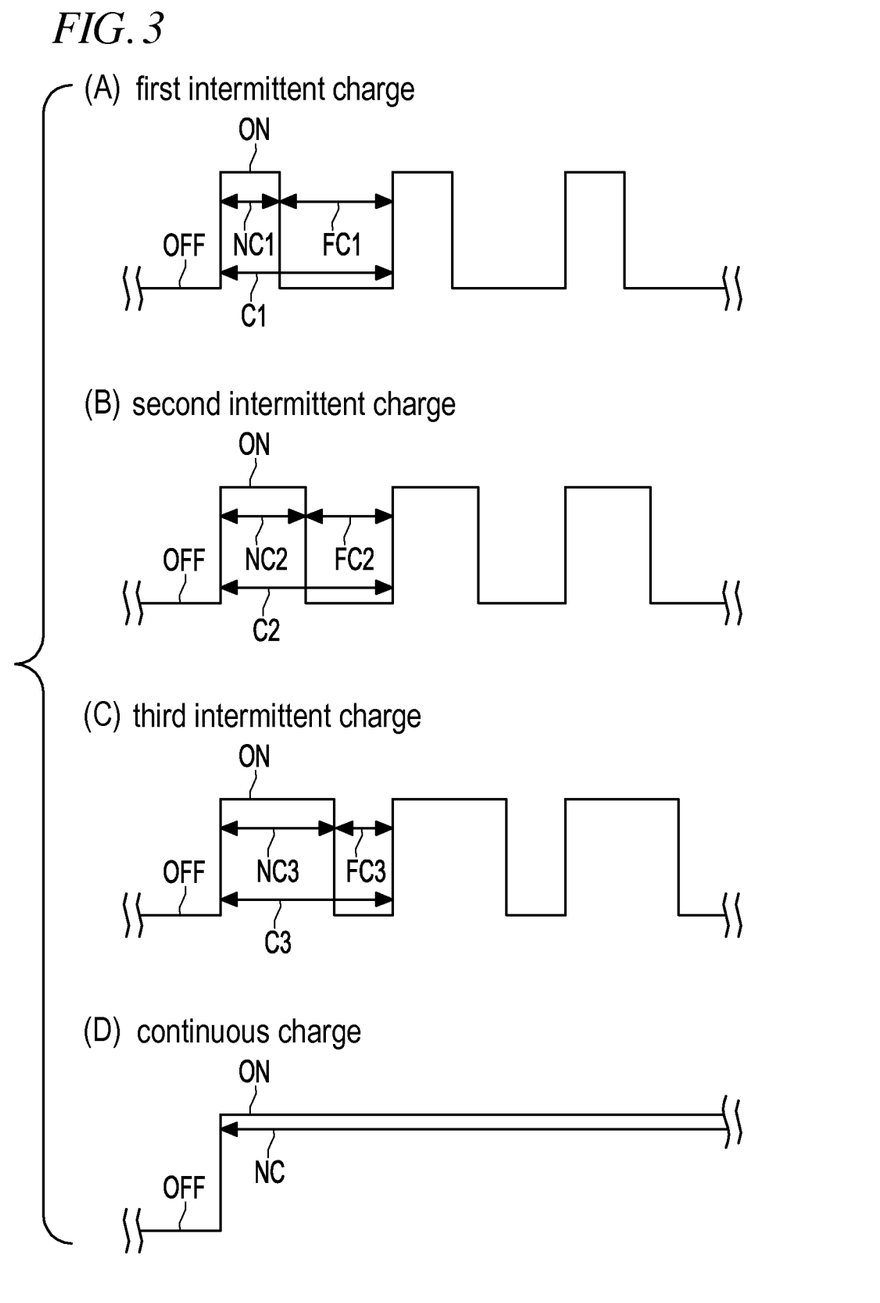
FIG. 3 shows an example of a duty ratio of an intermittent charge which is performed for the secondary battery shown in FIG. 1.

(A) to (D) of FIG. 3 show duty ratios of an intermittent charge. In (A) to (D) of FIG. 3, the switch SW1 is on and the secondary battery 38 is charged at an 'ON' state. On the other hand, the switch SW is off and the secondary battery 38 is not charged at an 'OFF' state. Also, as can be seen from (A) to (D) of FIG. 3, the duty ratios of the intermittent charge are respectively different.

In the meantime, the intermittent charge is a charge in which one period C including an on state NC and an off state FC is repeated. The duty ratio represents a ratio of the on state NC and the off state FC in one period C. That is, the duty ration of 100% means a continuous charge having only the on state FC, and the duty ratio of 0% means that there is only the off state FC.

As shown in FIG. 3(A), in a first intermittent charge, a first period C1 (the duty ratio thereof is smaller than 50%) which includes a first on state NC1 and a second off state FC1 longer than the first on state NC1, is repeated. FIG. 3(B) shows a second intermittent charge where a second period C2 (the duty ratio thereof is 50%) including a second on state NC2 and a second off state FC2, which have the same length, is repeated. As shown in FIG. 3(C), in a third intermittent charge, a third period C3 (the duty ratio thereof is larger than 50%), which includes a third on state NC3 and a third off state FC3 shorter than the third on state NC3, is repeated. Further, as shown in FIG. 3(D), in a continuous charge, the duty ratio is 100%. Hence, when the charge starts, the on state NC is kept.

In this illustrative embodiment, during the charging of the secondary battery 38, it is possible to change the duty ratio by switching among the first intermittent charge, the second intermittent charge, the third intermittent charge and the continuous charge. In the meantime, when the duty ratio in the intermittent charge is changed, the amount of heat generation in the power supply circuit 36 is also changed.

Here, as described above, in the portable phone 10, the wireless communication circuit 14 generates the heat during the voice communication and the power supply circuit 36 generates the heat during the charging of the secondary battery 38, so that a housing temperature $T_c$ of the portable phone 10 is increased. Hence, a prescribed temperature (for example, 43 degrees) is set such that the user does not have uncomfortable feeling to the housing temperature $T_c$. When the secondary battery 38 is being charged while the call processing is performed, the secondary battery 38 has been intermittently charged such that the housing temperature $T_c$ does not exceed the prescribed temperature.

However, when the call processing is performed in the weak electric field during the charging, the power consumption of the portable phone 10 is increased. Thus, it is assumed that the power consumption exceeds an amount of charge. In order to cope with this situation, when the on state NC is prolonged in the intermittent charge, the amount of heat generation is increased in the power supply circuit 38 and the housing temperature $T_c$ may exceed the prescribed temperature.

Hence, in this illustrative embodiment, when the secondary battery 38 is being charged while the call processing is performed, the duty ratio of the intermittent charge is appropriately changed such that the housing temperature $T_c$ does not exceed the prescribed temperature and the secondary battery 38 is appropriately charged.

For example, the housing temperature $T_c$ is a sum of a heat source temperature $\Delta T$ of heat sources such as the wireless communication circuit 14 and the power supply circuit 36 of the portable phone 10 and a surrounding temperature $T_A$ of the heat source within the housing. Also, the heat source temperature $\Delta T$ is almost constant when the communication state or charging state is not changed. Hence, it can be considered that a change of the surrounding temperature $T_A$ is a change of the housing temperature $T_c$. Accordingly, in this illustrative embodiment, the duty ratio of the intermittent charge is changed based on the transmission power P and the surrounding temperature $T_A$ correlating with the housing temperature $T_c$. In the meantime, the surrounding temperature $T_A$ can be obtained by substituting the battery temperature $T_B$ for a predetermined equation. The transmission power P can be converted from a receiving sensitivity of the electric wave obtained by the wireless communication circuit 14, based on a transmission power table that will be described later. Hence, in this illustrative embodiment, the thermistor TH functions as an example of a first detection unit which detects the surrounding temperature $T_A$ and the wireless communication circuit 14, and the processor 24 function as an example of a second detection unit which detects the transmission power P.

Specifically, the surrounding temperature $T_A$ and the transmission power P are respectively divided into three ranges, and the duty ratio of the intermittent charge is changed based on a combination thereof.

Figure 4:
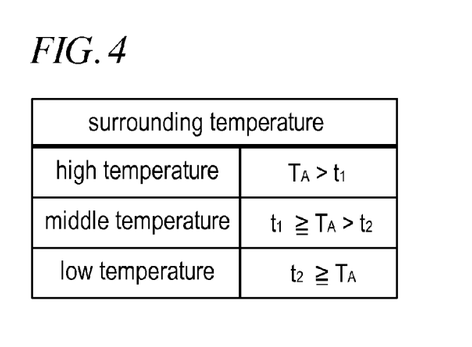
FIG. 4 shows an example of a plurality of temperature ranges of a surrounding temperature of the portable phone shown in FIG. 1.

Referring to FIG. 4, regarding the surrounding temperature $T_A$, three temperature ranges of 'high temperature', 'middle temperature' and 'low temperature' are set, based on a first threshold t1 and a second threshold t2 smaller than the first threshold t1. That is, when the surrounding temperature $T_A$ is higher than the first threshold t1, it is determined that the surrounding temperature is included within the temperature range of 'high temperature.' Also, when the surrounding temperature $T_A$ is equal to or lower than the first threshold t1 and is higher than the second threshold t2, it is determined that the surrounding temperature is included within the temperature range of 'middle temperature.' When the surrounding temperature $T_A$ is equal to or lower than the second threshold t2, it is determined that the surrounding temperature $T_A$ is included within the temperature range of 'low temperature.'

For example, when the prescribed temperature 43° C. and a maximum value of the heat source temperature $\Delta T$ is 25° C., the first threshold t1 is set as 15° C. and the second threshold t2 is set as 12° C. In this case, when the surrounding temperature $T_A$ is higher than 15° C., it is determined that the surrounding temperature is included within the temperature range of 'high temperature', when the surrounding temperature $T_A$ is higher than 12° C. and equal to or lower than 15° C., it is determined that the surrounding temperature is included within the temperature range of 'middle temperature', and when the surrounding temperature $T_A$ is 12° C. or lower, it is determined that the surrounding temperature is included within the temperature range of 'low temperature.'

Figure 5:
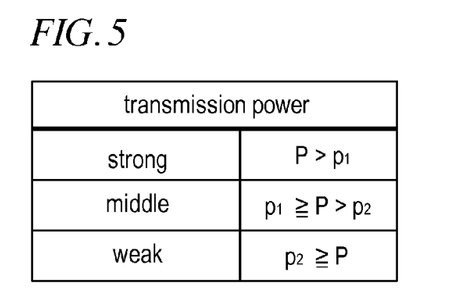
FIG. 5 shows an example of a plurality of transmission power ranges of a transmission power of the portable phone shown in FIG. 1.

Then, referring to FIG. 5, regarding the transmission power P, three transmission power ranges of 'strong', 'middle' and 'weak' are set. That is, when the transmission power P is larger than a first threshold p1, it is determined that the transmission power is included within the transmission power range of 'strong.' Also, when the transmission power P is equal to or smaller than the first threshold p1 and is larger than a second threshold p2, it is determined that the transmission power is included within the transmission power range of 'middle.' When the transmission power P is equal to or smaller than the second threshold p2, it is determined that the transmission power is included within the transmission power range of 'weak.'

For example, in a case where the first threshold p1 is +10 dB, when the transmission power P is larger than +10 dB, it is determined that the transmission power is included within the transmission power range of 'strong.' Also, in a case where the second threshold p2 is '0 dB', when the transmission power P is larger than 0 dB and equal to or smaller than +10 dB, it is determined that the transmission power is included within the transmission power range of 'middle.' Also, when the transmission power P is 0 dB or smaller, it is determined that the transmission power is included within the transmission power range of 'weak.'

Figure 6:
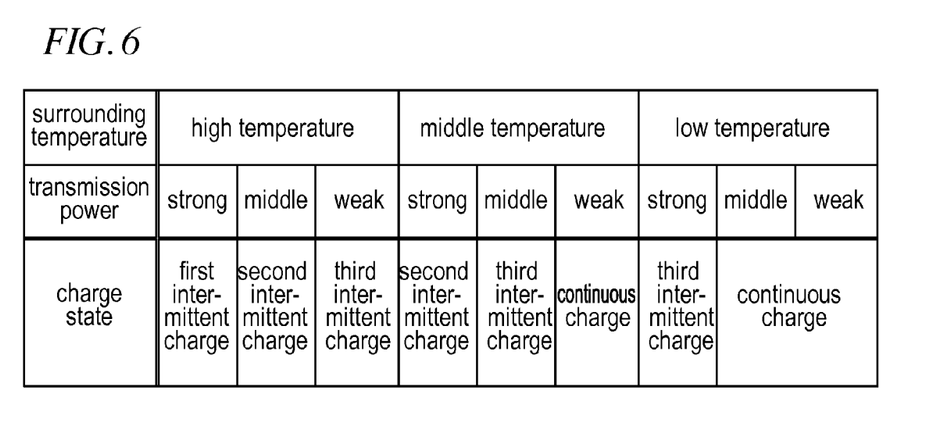
FIG. 6 shows an example of a change in a duty ratio of an intermittent charge which is performed for the secondary battery shown in FIG. 1.

Based on a combination of the surrounding temperature $T_A$ and the transmission power P, which are determined as described above, the duty ratio of the intermittent charge is changed, as shown in FIG. 6. Specifically, referring to FIG. 6, when the surrounding temperature $T_A$ is included within the temperature range of 'high temperature' and the transmission power P is included within the transmission power range of 'strong', the first intermittent charge is set. Also, when the transmission power P is included within the transmission power range of 'middle' at the above state, the second intermittent charge is set, and when the transmission power P is included within the transmission power range of 'weak' at the above state, the third intermittent charge is set. That is, in this illustrative embodiment, the duty ratio of the intermittent charge is changed such that as the amount of heat generation in the wireless communication circuit 14 increases, the heat generated in the power supply circuit 36 decreases.

Also, in a case where the surrounding temperature $T_A$ is included within the temperature range of 'middle temperature', when the transmission power P is in the transmission power range of 'strong', the second intermittent charge is set, and when the transmission power P is included within the transmission power range of 'middle' at that state, the third intermittent charge is set. When the transmission power P is included within the transmission power range of 'weak', the duty ratio is changed such that the continuous charge is performed. That is, in the case where the surrounding temperature $T_A$ is included within the temperature range of 'middle temperature', when the transmission power is included within the transmission power range of 'middle' or 'strong', the intermittent charge is performed so as to suppress the amount of heat generation in the power supply circuit 36. When the receiving state of the electric wave is good, since the housing temperature $T_c$ does not exceed the prescribed temperature even though the power supply circuit 36 generates the heat, the secondary battery 38 is continuously charged.

Also, in a case where the surrounding temperature $T_A$ is included within the temperature range of 'low temperature', when the transmission power P is included within the transmission power range of 'strong', the third intermittent charge is set, and when the transmission power is included within the transmission power range of 'middle' or 'weak' at that state, the continuous charge is set.

That is, in this illustrative embodiment, when intermittently charging the secondary battery 38, the duty ratio is changed based on the receiving state of the electric wave and the housing temperature $T_c$. Hence, it is possible to appropriately charge the secondary battery 38 without causing the user to have uncomfortable feeling due to the housing temperature $T_c$.

Also, it is possible to set the duty ratio such that the amount of heat generation in the power supply circuit 36 is increased when the surrounding temperature $T_A$ is high and to set the duty ratio such that the time to charge the secondary battery 38 is prolonged when the surrounding temperature $T_A$ is low.

Particularly, like this illustrative embodiment, since the duty ratio is set by combining the plurality of temperature ranges and the plurality of transmission power ranges, it is possible to easily grasp the state where the secondary battery 38 is being charged.

Figure 7:
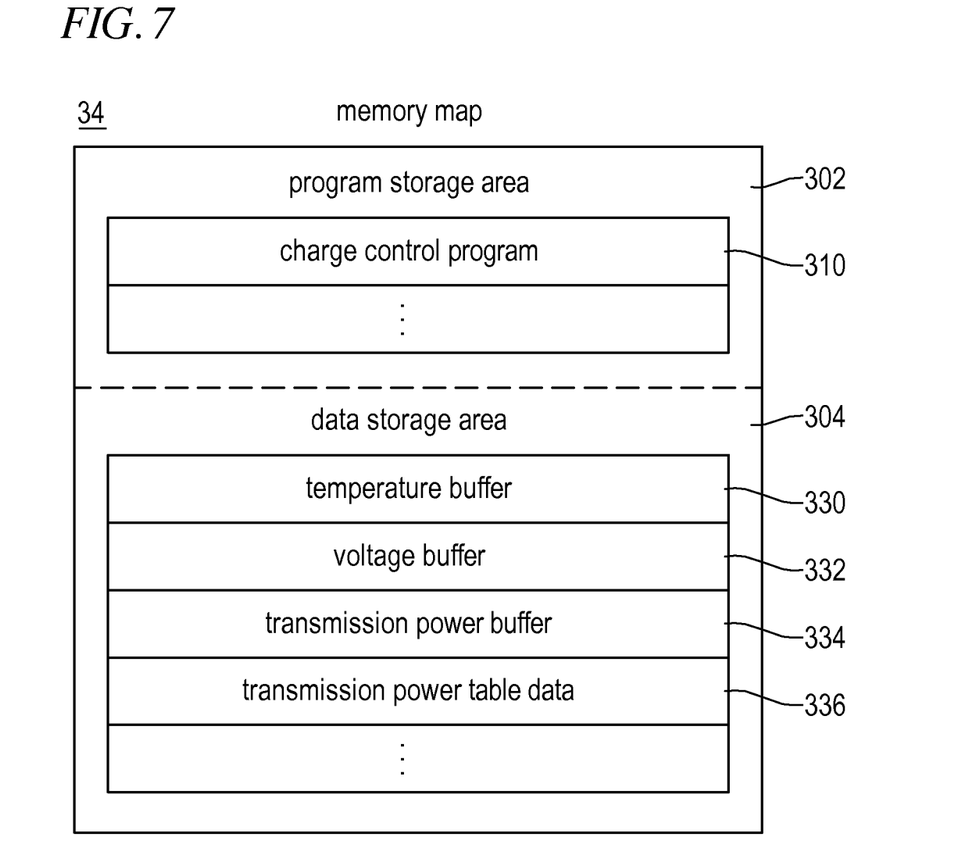
FIG. 7 shows an example of a memory map of a RAM shown in FIG. 1.

FIG. 7 shows an example of a memory map of the RAM 34. The RAM 34 includes a program storage area 302 and a data storage area 304. Also, parts of a program and data are read out at once or partially and sequentially from the flash memory 32 and are then stored in the RAM 34.

The program storage area 302 stores therein a program for operating the portable phone 10. For example, the program for operating the portable phone 10 includes a charge control program 310 and the like. The charge control program 310 is a program for switching between the intermittent charge and the continuous charge of the secondary battery and for controlling the duty ratio of the intermittent charge, etc. In the meantime, although not shown, the program for operating the portable phone 10 includes a program for notifying a voice incoming state, a program for performing communication with the outside, and the like.

Also, the data storage area 304 is provided with a temperature buffer 330, a voltage buffer 332 and a transmission power buffer 334 and stores therein transmission power table data 336. The temperature buffer 330 temporarily stores therein the surrounding temperature $T_A$ which is detected using the thermistor TH of the secondary battery 38. The voltage buffer 330 temporarily stores a battery voltage of the secondary battery 38. The transmission power buffer 334 temporarily stores transmission power which is converted based on a transmission power table (which will be described later).

The transmission power table data 336 is a table in which values of the transmission power P are recorded in correspondence to the receiving sensitivities of the electric wave. As described above, the receiving sensitivity of the electric wave is converted into the transmission power P based on the transmission power table data 336.

In the meantime, although not shown, the data storage area 304 also stores image data which is displayed at a standby state, data of character strings and the like, and is provided with a counter and a flag necessary for the operation of the portable phone 10.

Figure 8:
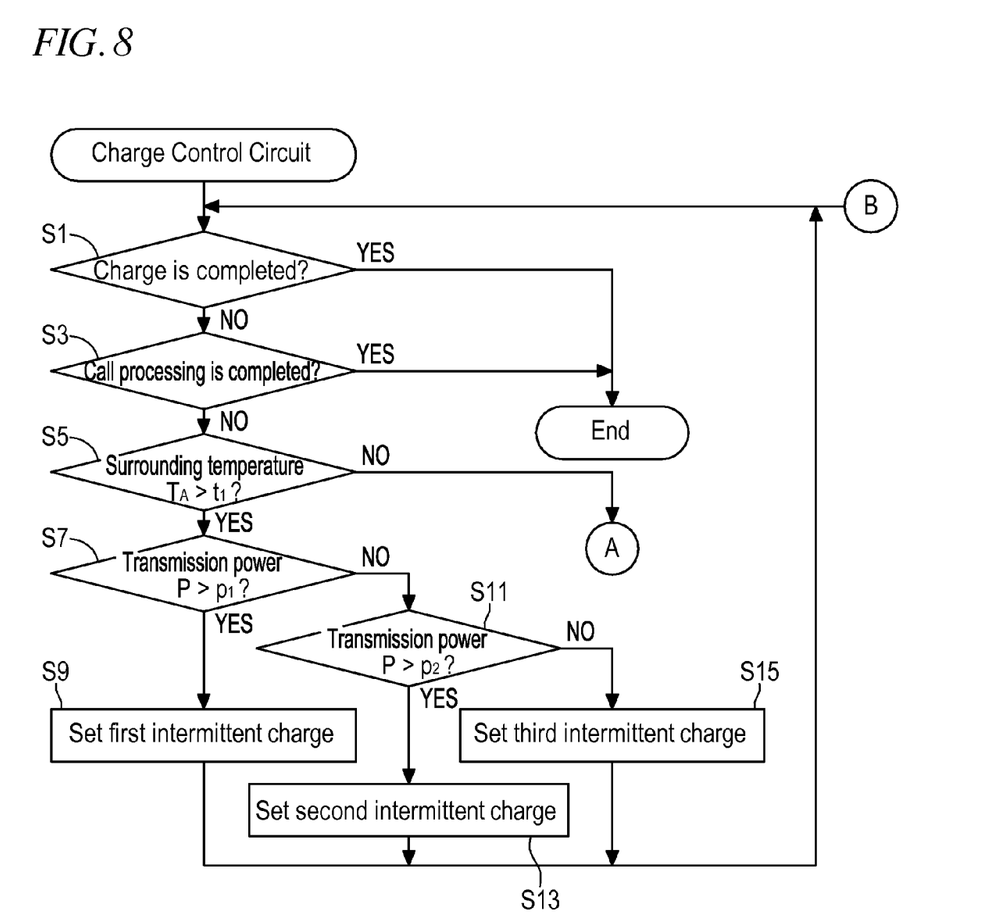
FIG. 8 is a flow chart showing an example of a part of charge control processing of a processor shown in FIG. 1.
Figure 9:
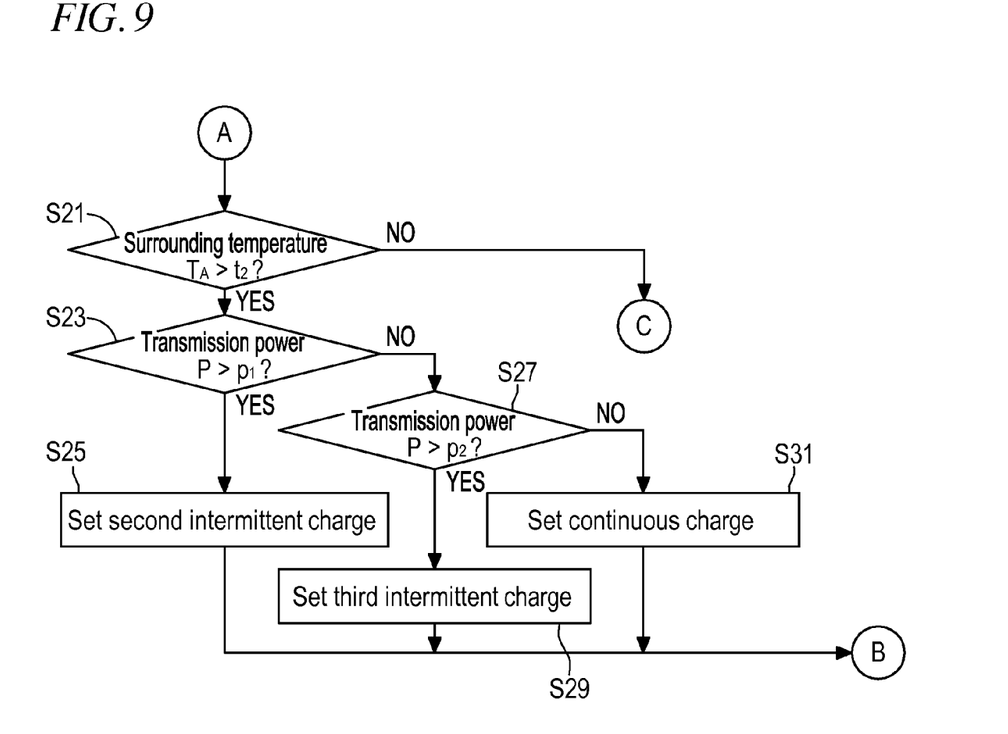
FIG. 9 is a flow chart following FIG. 8, which shows an example of another part of the charge control processing of the processor shown in FIG. 1.
Figure 10:
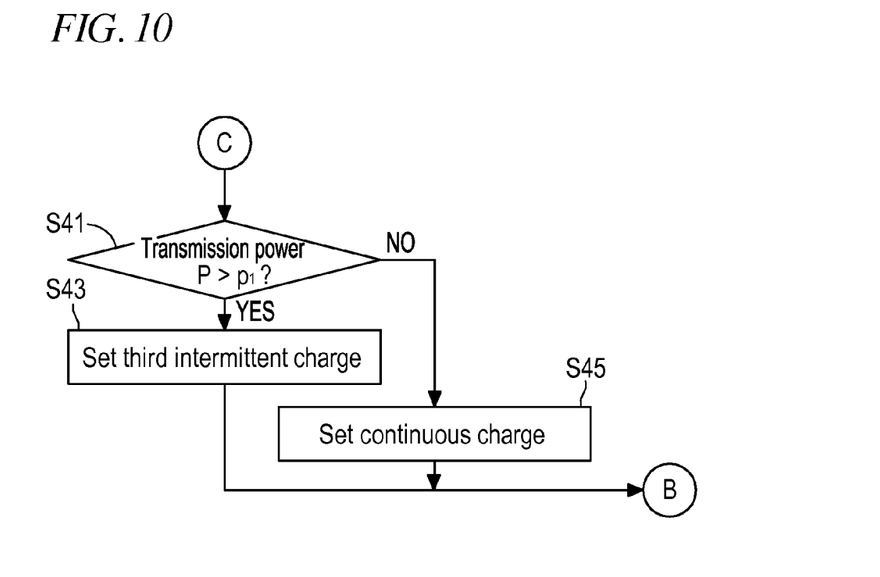
FIG. 10 is a flow chart following FIG. 9, which is an example of another part of the charge control processing of the processor shown in FIG. 1.

The processor 24 executes a plurality of tasks including charge control processing shown in FIGS. 8 to 10 and the like in parallel, under control of Linux (registered trademark) based OS such Android (registered trademark) and REX, or the other OS.

FIGS. 8 to 10 are flow charts of the charge control processing. For example, when the call processing is established at a state where the secondary battery 38 is being charged, the processor 24 determines in step S1 whether the charging is completed or not. That is, it is determined whether the charging of the secondary battery 38 is completed. When a result of the determination in step S1 is "NO", i.e., when the charging of the secondary battery 38 is not completed, the processor 24 determines in step S3 whether the call processing is terminated. For example, it is determined in step S3 whether the call ending key is operated or not. When a result of the determination in step S1 or S3 is "YES", i.e., when the full charge state of the secondary battery 38 is detected or when the call processing is terminated, the charge control processing ends.

When a result of the determination in step S3 is "NO", i.e., when the call processing continues during the charging, it is determined in step S5 whether the surrounding temperature $T_A$ is higher than the first threshold t1. That is, the processor 24 determines whether the surrounding temperature $T_A$ stored in the temperature buffer 330 is included within the temperature range of 'high temperature.' When a result of the determination in step S5 is "NO", i.e., when the surrounding temperature $T_A$ is not included within the temperature range of 'high temperature', the process proceeds to step S21 shown in FIG. 9.

On the other hand, when a result of the determination in step S5 is "YES", i.e., when the surrounding temperature $T_A$ is included within the temperature range of 'high temperature', it is determined in step S7 whether the transmission power P is higher than the first threshold p1. That is, the processor 24 determines whether the transmission power P stored in the transmission power buffer 334 is included within the transmission power range of 'strong.'

When a result of the determination in step S7 is "YES", i.e., when the surrounding temperature TA is included within the temperature range of 'high temperature' and the transmission power P is included within the transmission power range of 'strong', the first intermittent charge is set in step S9 so as to make the duty ratio having the time of the off state longer than the time of the on state. Then, when the processing of step S9 is completed, the process returns to step S1.

On the other hand, when a result of the determination in step S7 is "NO", i.e., when the transmission power P is not included within the transmission power range of 'strong', it is determined in step S11 whether the transmission power P is higher than the second threshold p2. That is, the processor 24 determines whether the transmission power P is included within the transmission power range of 'middle.' When a result of the determination in step S11 is "YES", i.e., when the surrounding temperature $T_A$ is included within the temperature range of 'high temperature' and the transmission power P is included within the transmission power range of 'middle', the second intermittent charge is set in step S13 so as to make the duty ratio of 50%.

Also, when a result of the determination in step S11 is "NO", i.e., when the surrounding temperature $T_A$ is included within the temperature range of 'high temperature' and the transmission power P is included within the transmission power range of 'weak', the third intermittent charge is set in step S15 so as to make the duty ratio having the time of the on state longer than the time of the off state. Then, when the processing of step S13 or S15 is completed, the process returns to step S1.

Then, in step S21 shown in FIG. 9, it is determined whether the surrounding temperature $T_A$ is higher than the second predetermined value t2. That is, it is determined whether the surrounding temperature $T_A$ is included within the temperature range of 'middle temperature.' When a result of the determination in step S21 is "NO", i.e., when the surrounding temperature $T_A$ is not included within the temperature range of 'low temperature', the process proceeds to step S41 of FIG. 10.

On the other hand, when a result of the determination in step S21 is "YES", i.e., when the surrounding temperature $T_A$ is included within the temperature range of 'middle temperature', it is determined in step S23 whether the transmission power P is higher than the first threshold p1. When a result of the determination in step S23 is "YES", i.e., when the surrounding temperature $T_A$ is included within the temperature range of 'middle temperature' and the transmission power P is included within the transmission power range of 'strong', the second intermittent charge is set in step S25. Also, when a result of the determination in step S23 is "NO", i.e., when the transmission power P is not included within the transmission power range of 'strong', it is determined in step S27 whether the transmission power P is higher than the first threshold p2.

When a result of the determination in step S27 is "YES", i.e., when the surrounding temperature $T_A$ is included within the temperature range of 'middle temperature' and the transmission power P is included within the transmission power range of 'middle', the third intermittent charge is set in step S29. Also, when a result of the determination in step S27 is "NO", i.e., when the surrounding temperature $T_A$ is included within the temperature range of 'middle temperature' and the transmission power P is included within the transmission power range of 'weak', the continuous charge is set in step S31. Then, when the processing of step S25, S29 or S31 is completed, the process returns to step S1 of FIG. 8.

Then, when the surrounding temperature $T_A$ is included within the temperature range of 'low temperature', it is determined in step S41 of FIG. 10 whether the transmission power P is higher than the first threshold p1. When a result of the determination in step S41 is "YES", i.e., when the surrounding temperature $T_A$ is included within the temperature range of 'low temperature' and the transmission power P is included within the transmission power range of 'strong', the third intermittent charge is set in step S43. On the other hand, when a result of the determination in step S41 is "NO", i.e., when the transmission power P is included within the transmission power range of 'middle' or 'weak', the continuous charge is set in step S45. Then, when the processing of step S43 or S45 is completed, the processor returns to step S1.

In the meantime, the processor 24 which executes the processing of step S9, S13, S15, S25, S29, S31, S43 and S45 functions as an example of a change unit. Also, the processor 24 which executes the processing of step S5 and S21 functions as an example of a temperature determination unit. Further, the processor 24 which executes the processing of step S7, S11, S23, S27 and S41 functions as an example of a transmission power determination unit.

The charge control processing is repeated every predetermined time (for example, 30 seconds). Hence, it is possible to appropriately change the duty ratio of the intermittent charge according to the change of the state of the portable phone 10.

When the case of the portable phone 10 is made of a material having high thermal conductivity such as metal, the effects of this illustrative embodiment are more remarkable.

In a charge control processing according to another illustrative embodiment, it may be possible to set the first intermittent charge, the second intermittent charge, or the third intermittent charge based on the surrounding temperature $T_A$ and the transmission power P, by using the table shown in FIG. 6. Also, it may be possible to change the duty ratio of the intermittent charge more finely by further setting an intermittent charge having a different duty ratio. The temperature ranges and the transmission power ranges may be divided into two or four or more ranges. Also, the duty ratio of the intermittent charge may be calculated based on an equation including the surrounding temperature $T_A$ and the transmission power P.

In another illustrative embodiment, a dedicated thermistor may be provided at a position spaced from the wireless communication circuit 14 or power supply circuit 36 and an output of the thermistor may be used as the surrounding temperature $T_A$.

In another illustrative embodiment, the duty ratio of the intermittent charge may be changed using the heat source temperature ΔT, instead of the surrounding temperature. In this case, an output of a thermistor, which is provided adjacent to an internal PA (Power AMP) in the wireless communication circuit 14, for example, becomes the heat source temperature ΔT.

In another illustrative embodiment, the transmission power P may be calculated by substituting the receiving sensitivity of the electric wave for the equation.

In the above-described illustrative embodiment, the lithium ion battery is adopted as the secondary battery 38. However, a lead storage battery, a nickel-hydrogen battery, a sodium ion battery, a metal-air battery, a zinc bromide battery and the like may be also used.

Also, in the above-described illustrative embodiment, the communication method of the portable phone 10 is the CDMA method. However, the LTE (Long Term Evolution) method, the W-CDMA method, the GSM method, the TDMA method, the FDMA method, the PHS method and the like may be also adopted.

The programs which are used in the above-described illustrative embodiment may be stored in an HDD of a server for data transmission and may be transmitted to the portable phone 10 through the network. Also, a recording medium having the programs recorded therein such as an optical disk, for example CD, DVD, BD (Blu-ray Disc) and the like, a USB memory and a memory card may be sold or distributed. When the programs downloaded through the server or recording medium are installed in a portable phone having the equivalent configuration to this illustrative embodiment, the equivalent effects to this illustrative embodiment are obtained.

The above-described illustrative embodiment is not limited to the portable phone 10 and may be applied to a smart phone and a PDA (Personal Digital Assistant).

The circuit configurations of the power supply circuit 36 and the secondary battery 38 and the specific values of the prescribed temperature, the heat source temperature ΔT, the first threshold t1, the second threshold t2, the first threshold p1, the second threshold p2, the predetermined time and the like, which are described in the specification, are only exemplary and can be appropriately changed in accordance with the specification change of a product.

What is claimed is:

1. A communication terminal having a secondary battery and configured to control charge of the secondary battery, the communication terminal comprising:
    a first detection unit configured to detect a temperature;
    a second detection unit configured to detect a transmission power of an electric wave;
    a charge unit configured to perform intermittent charge to the secondary battery;
    a change unit configured to change a duty ratio of the intermittent charge by the charge unit based on the temperature detected by the first detection unit and the transmission power detected by the second detection unit;
    a temperature determination unit configured to determine one of a plurality of temperature ranges based on the temperature detected by the first detection unit; and
    a transmission power determination unit configured to determine one of a plurality of transmission power ranges based on the transmission power detected by the second detection unit,
    wherein the change unit is configured to set different duty ratios according to the transmission power, for each of the temperature ranges,
    wherein the change unit is configured to set different duty ratios for the respective transmission power ranges, for each of the temperature ranges,
    wherein each of the different duty ratios is not 0%,
    wherein the secondary battery comprises the first detection unit, and
    wherein the first detection unit is provided at a position spaced from the second detection unit or charge unit.

2. A charge control method of a communication terminal which includes a secondary battery, a detection unit configured to detect a temperature and a transmission power of an electric wave, a charge unit configured to perform intermittent charge to the secondary battery, and which is configured to control charge of the secondary battery, and a change unit configured to change a duty ratio of the intermittent charge by the charge unit, the method comprising:
    changing a duty ratio of the intermittent charge by the charge unit based on the temperature and the transmission power detected by the detection unit;
    determining one of a plurality of temperature ranges based on the temperature detected by the first detection unit with a temperature determination unit;
    determining one of a plurality of transmission power ranges based on the transmission power detected by the second detection unit with a transmission power determination unit;
    setting different duty ratios according to the transmission power, for each of the temperature ranges with the change unit; and
    setting different duty ratios for the respective transmission power ranges, for each of the temperature ranges with the change unit,
    wherein each of the different duty ratios is not 0%,
    wherein the secondary battery comprises the detection unit, and
    wherein the detection unit is provided at a position spaced from the charge unit.

3. A communication terminal having a secondary battery and configured to control charge of the secondary battery, the communication terminal comprising:
    a first detection unit configured to detect a temperature;
    a second detection unit configured to detect a transmission power of an electric wave;
    a charge unit configured to perform intermittent charge to the secondary battery; and
    a change unit configured to change a duty ratio of the intermittent charge by the charge unit based on the temperature detected by the first detection unit and the transmission power detected by the second detection unit;
    a temperature determination unit configured to determine one of a plurality of temperature ranges based on the temperature detected by the first detection unit; and
    a transmission power determination unit configured to determine one of a plurality of transmission power ranges based on the transmission power detected by the second detection unit,
    wherein the change unit is configured to set different duty ratios according to the transmission power, for each of the temperature ranges,
    wherein the change unit is configured to set different duty ratios for the respective transmission power ranges, for each of the temperature ranges,
    wherein each of the different duty ratios is not 0%,
    wherein the first detection unit is provided at a position spaced from the second detection unit or charge unit.

* * * * *